United States Patent
Smith et al.

(10) Patent No.: US 7,578,481 B2
(45) Date of Patent: Aug. 25, 2009

(54) DIGITAL PROGRAMMABLE DRIVER FOR SOLENOID VALVES AND ASSOCIATED METHOD

(75) Inventors: Gregory H. Smith, Placentia, CA (US); James D. Spear, Orange, CA (US); Fernando C. Teran, Placentia, CA (US)

(73) Assignee: The Boeing Company, Chicago, IL (US)

( * ) Notice: Subject to any disclaimer, the term of this patent is extended or adjusted under 35 U.S.C. 154(b) by 680 days.

(21) Appl. No.: 11/066,176

(22) Filed: Feb. 25, 2005

(65) Prior Publication Data
US 2008/0105789 A1    May 8, 2008

(51) Int. Cl.
*F16K 31/02* (2006.01)
*B64G 1/40* (2006.01)

(52) U.S. Cl. ............ 244/171.1; 244/172.2; 251/129.04; 251/129.05; 251/129.06; 251/129.15; 361/160

(58) Field of Classification Search ............... 244/171.1, 244/172.2; 251/129.01, 129.04, 129.06, 251/129.15, 129.05; 361/160
See application file for complete search history.

(56) References Cited

U.S. PATENT DOCUMENTS 6,267,326 B1 *  7/2001  Smith et al. ................. 244/3.22
6,427,971 B1 *  8/2002  Kawabe et al. ......... 251/129.04

* cited by examiner

*Primary Examiner*—J. Woodrow Eldred
(74) *Attorney, Agent, or Firm*—Alston & Bird LLP (57) ABSTRACT

A digital programmable driver for a solenoid valve comprises at least one valve driver circuit for opening and closing the valve and a controller capable of sending an output signal to the valve driver circuit. The valve driver circuit comprises a power switch for providing current to the valve in order to open the valve. The output signal sent by the controller directs the power switch of the valve driver circuit to provide current to the valve, thereby causing the valve to open. The controller receives a plurality of parameter values, and responsive to the plurality of parameter values, calculates a rise time, a pull-in duty cycle, a fall time, and a hold duty cycle so as to modify the output signal sent to the valve driver circuit. The plurality of parameter values comprises valve resistance, valve inductance, supply voltage, valve pull-in current, valve hold current, and valve pull-in time.

33 Claims, 5 Drawing Sheets

DIGITAL PROGRAMMABLE DRIVER FOR SOLENOID VALVES AND ASSOCIATED METHOD

FEDERALLY SPONSORED RESEARCH OR DEVELOPMENT

This invention was made with government support. The government has certain rights in this invention.

FIELD OF THE INVENTION

The present invention is related to drivers for solenoid valves, and more particularly, to digital programmable drivers for solenoid valves and associated actuation methods.

BACKGROUND OF THE INVENTION

In order to control the flight and other operational characteristics of an unmanned vehicle, such as a satellite, a missile, or a re-entry vehicle, a conventional satellite includes a significant amount of control electronics. Among other things, the control electronics control the flight of the satellite by selectively activating the rockets that propel and direct the satellite toward its orbit. In this regard, the control electronics generally control valves associated with each engine which are designed selectively to provide fuel to the engines. In addition, the control electronics direct the operation of a number of sensors and other instruments which aid in the guidance of the satellite as well as the operation of communications equipment. Additionally, the control electronics typically activates the batteries associated with the on-board electrical equipment, such as sensors, instruments, communications equipment and the like, in order to activate the on-board electrical equipment. Likewise, the control electronics typically squib the pressure tanks in order to build pressure in the fuel tank and the oxidizer tank.

Conventionally, the control circuitry of satellites or other unmanned vehicles includes separate driver circuits, each of which typically includes a separate controller, for providing control signals to respective electrical subsystems. For example, separate driver circuits are generally associated with each valve in order to control the associated engines. In this regard, a valve driver circuit would typically provide signals to the solenoid of the respective valve that cause the valve to open or close. In instances in which the valve is open, a mixture of fuel is typically provided to the engine which causes the engine to propel the satellite in a desired direction. Alternatively, in instances in which the valve is closed, fuel is no longer provided to the engine and no further propulsion is provided by the engine. Since more current is generally required in order to initially open a valve as opposed to maintaining a valve in an open position, the control electronics associated with the valve of each engine preferably initially provides a pull-in current in order to open the valve and then subsequently provides a hold current, which is significantly less than the pull-in current, in order to maintain the valve in the open position.

In addition to the separate driver circuits that are typically required for the solenoid of each valve, separate driver circuits are typically required for actuating each ordnance or squib carried by the satellite. In this regard, ordnances or squibs are typically associated with batteries carried by the satellite such that the actuation of an ordnance activates the respective battery which, in turn, provides power to other associated electrical subsystems, such as a sensor, an instrument, communications equipment or the like. In addition, ordnances or squibs can be disposed between the pressure tanks and the fuel tank and the oxidizer tank in order to cause the fuel and oxidizer tanks to be pressurized upon actuating of the ordnances.

However, since separate driver circuits are typically provided for each valve and each ordnance, the control electronics of a conventional unmanned vehicle is unfortunately relatively heavy and occupies a significant amount of space. In order to reduce the weight of the control electronics and to reduce the space consumed by the control electronics, a multi-channel driver circuit has been developed for controlling a plurality of valves and a plurality of ordnances. In this regard, the multi-channel driver circuit includes a plurality of valve drivers associated with respective valves and operating under control of a common controller, such as a programmable logic device. As such, the multi-channel driver circuit can individually actuate each valve, in order to open the valve and provide fuel to the respective engine. In particular, each valve driver can provide a pull-in current for a predetermined pull-in time in order to initially open a valve and can then provide a reduced level of current, namely, a hold current, for the remainder of the period during which the valve is held in an open position. A multi-channel driver circuit is described in U.S. Pat. No. 6,267,326 to Smith et al., which is incorporated herein by reference in its entirety.

U.S. Pat. No. 6,267,326 to Smith et al. also discloses one method of applying the correct pull-in and hold currents to the valves. In U.S. Pat. No. 6,267,326 to Smith et al., a comparator is used to measure the current applied to a valve. The comparator compares the voltage appearing across a relatively small resistor to a predetermined value and provides the controller with an indication of whether the voltage across the resistor is greater or less than the predetermined amount which, in turn, provides an indication that the current flowing through the valve is greater or less than desired. If less current is flowing through the valve than desired as indicated by the output of the comparator, the controller directs that the valve remains connected to the supply voltage and current flows through the valve. If, however, the current provided to the valve is greater than desired as indicated by the voltage appearing across the relatively small resistor being greater than the predetermined value, the comparator provides the controller with a feedback signal such that the controller, in turn, disconnects the valve from the supply voltage. Once the comparator detects that the voltage across the resistor falls below the predetermined level, the comparator provides the controller with another signal which causes the controller to reconnect the valve to the supply voltage and to have current pass therethrough. As such, the current actually provided to the valve generally oscillates about the desired value as the valve is alternatively disconnected and connected to the supply voltage as the voltage appearing across the resistor exceeds and then falls below the predetermined value, respectively. The predetermined voltage level is generally set by a voltage divider network, with the particular resistor values predetermined to establish the predetermined voltage levels. In this method, the pull-in and the hold currents cannot be easily modified, as the resistor values of the voltage divider network must be modified to change the reference voltage value, which would in turn change the pull-in and/or hold currents.

The pull-in and hold currents may need to be modified by the manufacturer of the satellite. For example, during testing of the satellite it may be determined that a larger pull-in current is required. Alternatively, the valve may need to be replaced with a different valve with different pull-in and hold current requirements. The requirement to physically change the circuitry in order to change the pull-in and/or hold currents can be very costly and time consuming, especially when the changes are made late in the design development of the satellite. Additionally, conditions that occur during flight of the satellite, such as changes in valve resistance and inductance, may alter the pull-in and/or hold current requirements. Physical changes to the circuitry are not possible during flight.

Therefore it would be desirable to have an improved driver for solenoid valves that permit the necessary parameters to open and maintain solenoid valves to be quickly and easily modified, thereby allowing design changes to the satellite to occur late in the development cycle, or allowing changes to the pull-in and/or hold currents to be made during flight.

BRIEF SUMMARY OF THE INVENTION

An improved digital programmable driver for a solenoid valve and an associated method are therefore provided that permit quick and easy modification of the output signals that control the opening and closing of the associated valve. The digital programmable driver includes at least one valve driver circuit for opening and closing the valve and a controller capable of sending an output signal to the valve driver circuit. The valve driver circuit generally includes a power switch for providing current to the valve in order to open the valve. The output signal sent by the controller directs the power switch of the valve driver circuit to provide current to the valve, thereby causing the valve to open. The controller typically receives a plurality of parameter values, and responsive to the plurality of parameter values, modifies the output signal sent to the valve driver circuit. In one embodiment of the invention, the controller is a field programmable gate array. The plurality of parameter values typically include valve resistance (R), valve inductance (L), supply voltage (V), valve pull-in current ($I_P$), valve hold current ($I_H$), and valve pull-in time ($T_P$).

In one embodiment of the invention, the controller determines a rise time ($T_R$), a pull-in duty cycle ($DC_P$), a fall time ($T_F$), and a hold duty cycle ($DC_H$). The controller typically causes the output signal to have a 100% duty cycle for a period of time equal to the calculated rise time, thereby causing the current provided to the valve to increase until it is approximately equal to the pull-in current. Thereafter, the controller typically causes the output signal to have a duty cycle equal to the pull-in duty cycle for a period of time equal to the valve pull-in time minus the rise time, thereby causing the current provided to the valve to be approximately equal to the pull-in current and causing the valve to open. Thereafter, the controller typically causes the output signal to have a 0% duty cycle for a period of time equal to the calculated fall time, thereby causing the current provided to the valve to decrease until it is approximately equal to the hold current. Thereafter, the controller typically causes the output signal to have a duty cycle equal to the calculated hold duty cycle, thereby causing the current provided to the valve to be approximately equal to the hold current and maintaining the valve in an open position.

The controller may calculate the rise time, pull-in duty cycle, fall time, and hold duty cycle as follows: $T_R=(L/R)*\ln(1-(I_P*R/V))$; $DC_P=I_P*R/V$; $T_F=-(L/R)*\ln((I_P-I_H)*R/V)$; and $DC_H=I_H*R/V$.

In one embodiment of the invention, the controller receives a modified parameter value, and the controller then modifies at least one of the rise time, the pull-in duty cycle, the fall time, or the hold duty cycle in response. Typically, the modified parameter value is the supply voltage, and the controller receives the modified supply voltage from an analog-to-digital converter. Other parameter values, such as the valve resistance, may also be modified. As such, the digital programmable driver of the present invention allows parameter values to be quickly and easily changed, either during design or manufacturing of the satellite, or during flight, thereby changing the current provided to open and hold open the valve in response.

The valve driver circuit may further comprise a control switch, responsive to the controller, for providing control signals to the power switch of the at least one valve driver circuit.

In one embodiment of the invention, the valve driver circuit further comprises a transistor and a resistor between the control switch and the power switch, such that current flowing through the power switch is limited to a predefined value, such as 20% greater than the maximum current value.

In one embodiment of the invention, the controller monitors the voltage at the output of the power switch, thereby allowing the controller to detect a short circuit of the valve by determining that the voltage at the output of the power switch is equal to zero volts. If the controller detects a short circuit, it directs the power switch to stop sending current to the valve, thus preventing damage to the valve and associated circuitry.

When a short circuit is detected, the controller may send an output signal of short duration to the valve driver circuit thereby directing the power switch to provide current of a corresponding short duration to the valve to determine if the short circuit has been resolved. The duration of the output signal may be approximately 10 milliseconds.

In one embodiment of the invention, the controller compares a pulse width of the current from the power switch to a pulse width of the output signal from the controller to determine if the pulse width of the current from the power switch matches the pulse width of the output signal from the controller, and directs the power switch to stop sending current to the valve when the pulse width of the current from the power switch does not match the pulse width of the output signal from the controller.

By permitting quick and easy modification of the necessary output signals that open and maintain solenoid valves, such as rise time, pull-in duty cycle, fall time, and hold duty cycle, the improved digital programmable driver and associated method thereby allow design changes to the satellite to occur late in the development cycle. These design changes can be made quickly and inexpensively, without associated hardware changes. The improved digital programmable driver and associated method also allow changes to the output signals to be made during flight, thereby adjusting to changing parameters, such as input voltage, and optimizing performance of the valves. By providing duty cycle control, such that the current is pulsed on rather than constantly on and such that the voltage versus time profile is optimized to the required values, the improved digital programmable driver and associated method reduces electrical power consumption.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
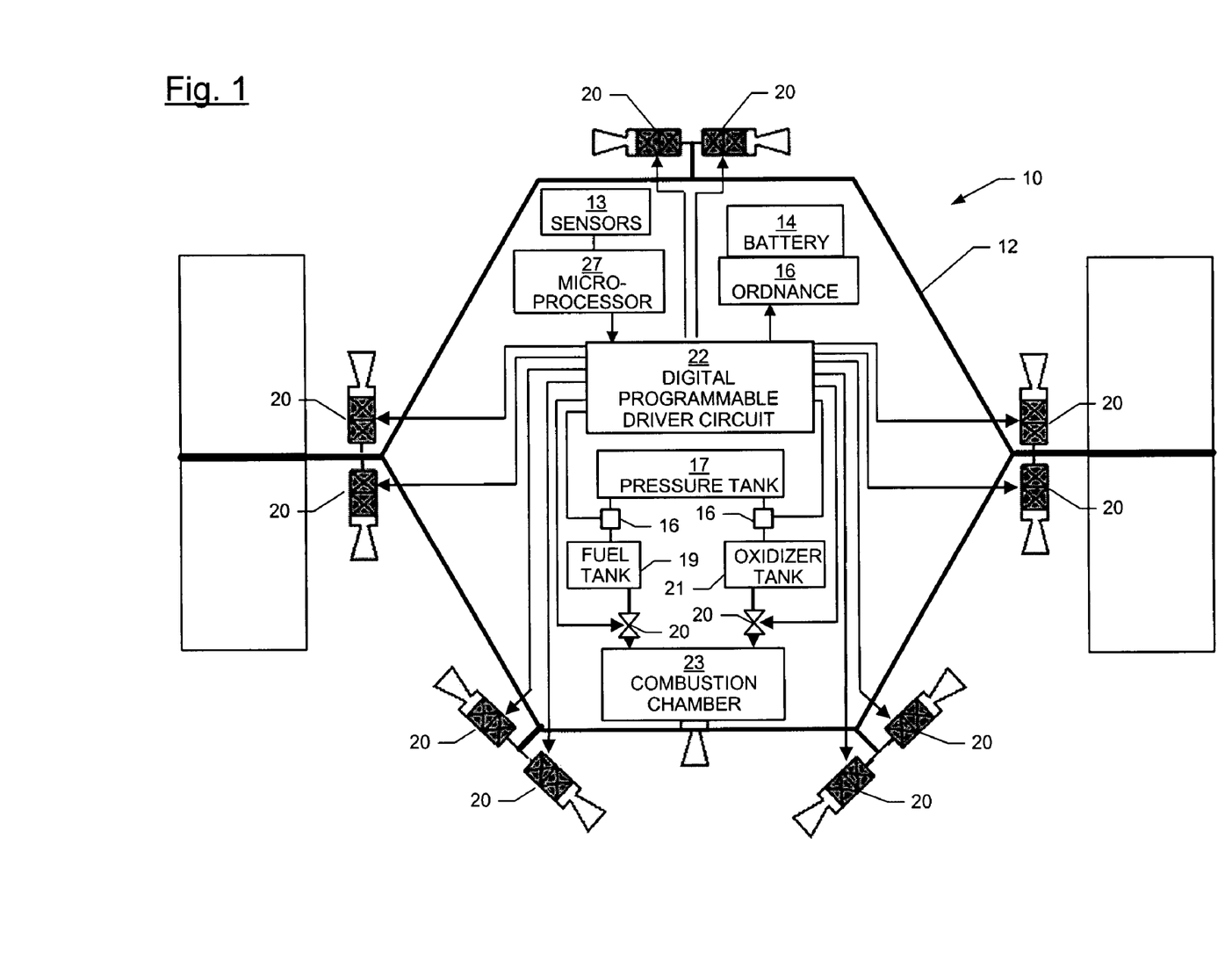
FIG. 1 is a schematic view of an unmanned vehicle, such as a satellite, having a plurality of ordnances and a plurality of valves controlled by a digital programmable driver circuit.

Referring now to FIG. 1, an unmanned vehicle 10, such as a satellite, is schematically depicted according to one embodiment of the present invention. In addition to the vehicle body 12, the unmanned vehicle includes a variety of electrical subsystems, such as sensors 13, instruments, communications equipment and the like. The unmanned vehicle also includes batteries 14 associated with respective ones of the electrical subsystems for providing power to the respective electrical subsystems. In order to controllably activate the batteries so as to supply power to the respective electrical subsystems, the unmanned vehicle also includes at least one ordnance or squib 16 (hereinafter referred to as an "ordnance") and, more typically, a plurality of ordnances disposed within the vehicle body. While the unmanned vehicle can include a variety of ordnances, one common ordnance is a squib or electro-explosive device (EED). In this instance, each ordnance would typically be associated with a respective battery such that actuation of the ordnance activates the respective battery. Once activated, the battery begins providing power to other electrical subsystems connected to the battery. As such, by controllably actuating the ordnances and, in turn, controllably activating the batteries associated with the ordnances, the electrical subsystems powered by the respective batteries can be selectively activated during various stages of the flight as defined by a predetermined flight plan or as dictated by actual flight conditions. Ordnances can also be associated with pressurized tank(s) 17. Once actuated, the ordnances permit the pressurized tank to increase the pressure within the fuel and oxidizer tanks 19, 21 in order to force fuel and oxidizer into the combustion chamber 23 as shown in FIG. 1.

The unmanned vehicle 10 can also include at least one valve 20 and, more typically, a plurality of valves for propelling the unmanned vehicle. For example, a satellite generally includes a plurality of valves for controllably delivering thrust at different locations relative to the centerline of the satellite and, in some instances, at different angles relative to the centerline defined by the vehicle body. By controllably activating the valves, the unmanned vehicle is therefore not only propelled, but is also controllably steered along an orbit.

The unmanned vehicle 10 also generally includes a combustion chamber 23 associated with the fuel tank 19 and the oxidizer tank 21 for supplying fuel to the valves 20. As such, the thrust is generally deactivated in instances in which the valve is closed and fuel is not provided to the valve. Conversely, the thrust is generally activated in instances in which the valve is open and fuel is provided from the combustion chamber. Since the valves of most satellites permit a combination of two liquid chemicals, namely, a fuel and an oxidizer, to burn, the opening of the valve generally permits the two types of liquid chemicals to thrust the satellite in the desired direction.

According to the present invention, the unmanned vehicle 10 also includes an apparatus, typically referred to as a digital programmable driver circuit 22, for controllably actuating both the valves 20 and ordnances 16 carried by the unmanned vehicle. Since the digital programmable driver circuit typically controls several valves, the digital programmable driver circuit includes at least one valve driver circuit associated with each valve 20. As explained herein below, the valve driver circuit serves to control the opening and closing of the respective valve by controllably actuating the solenoid associated with the valve. The digital programmable driver circuit also includes a controller for independently directing each valve driver circuit to open and close each respective valve.

Figure 2:
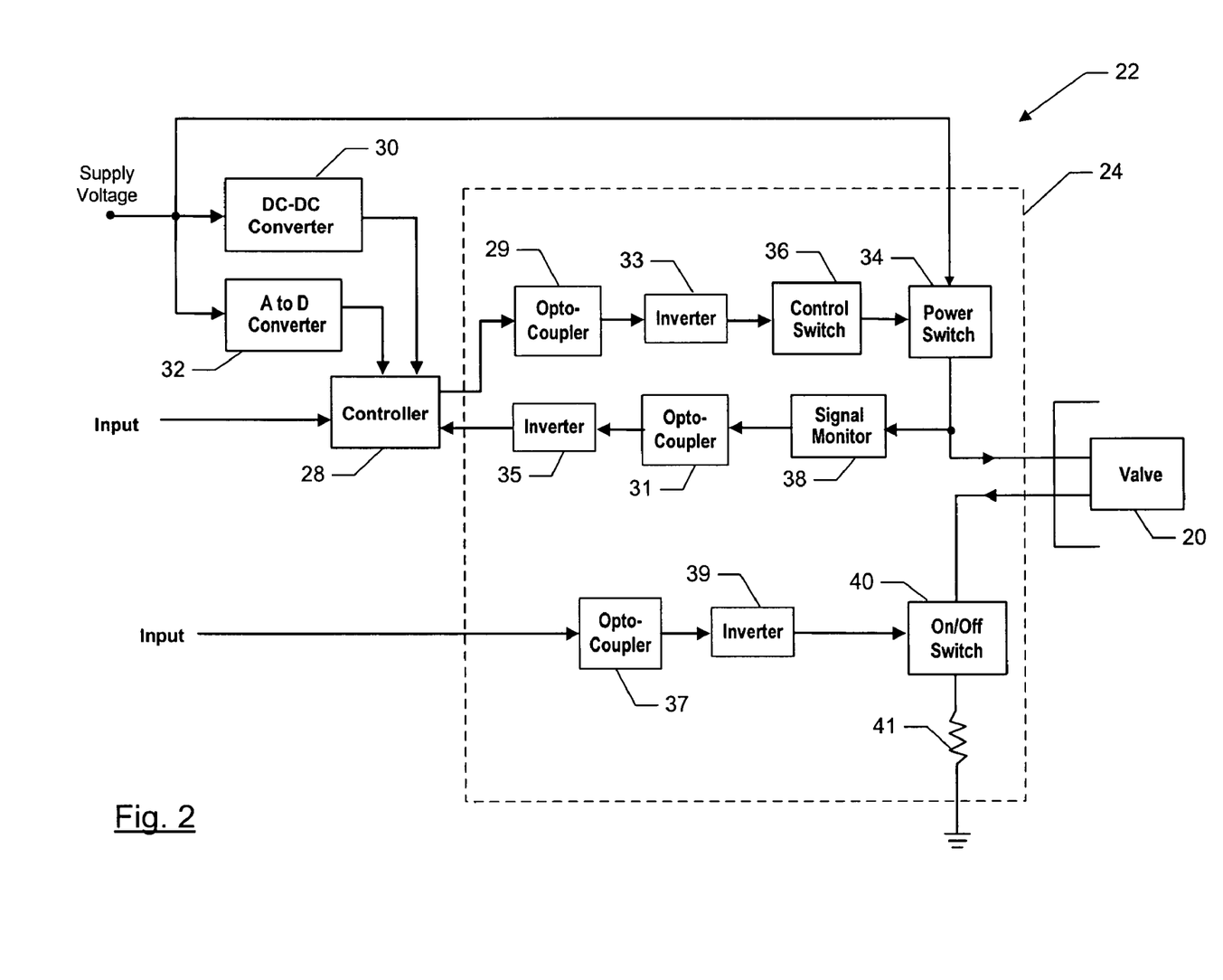
FIG. 2 is a block diagram of an apparatus for actuating valves, according to one embodiment of the present invention.

Referring now to FIG. 2, a block diagram of a digital programmable driver circuit 22 according to one advantageous embodiment of the present invention is depicted. The controller 28 for the valve driver circuit 24 can be a multi-channel programmable logic device with one channel assigned to each of the valve driver circuits. For example, the controller 28 may be a field programmable gate array, or any other suitable programmable logic device. As shown, the controller receives both power and external inputs. With respect to powering the programmable logic device, the digital programmable driver circuit is generally provided with a relatively large supply voltage, such as between about 24 VDC and 35 VDC. Since a controller, such as programmable logic device, requires a much lower input voltage, such as 5 VDC, the digital programmable driver circuit typically includes a DC/DC converter 30, such as a step down flyback converter, to convert the relatively high input voltage to a lower voltage, such as 5 VDC.

It should be appreciated that any device selected to be used as the controller 28, such as a programmable logic device, would typically feature radiation hardness to protect the device from radiation typically encountered by space vehicles.

In addition to power, the controller 28, such as the multi-channel programmable logic device, receives a plurality of external inputs for defining the desired state of the valves. For example, in the embodiment of FIG. 1, a microprocessor 27 provides the inputs which may be produced in response to information provided by a sensor 13. Typically, the multi-channel programmable logic device is designed to receive one input for each channel that defines the state of the valve associated with the respective channel. Although the programmable logic device can be designed to receive a variety of inputs, the inputs are generally binary coded inputs having a low state, such as 0 volts, indicating that the respective valve should not be actuated and a high state, such as 5 volts, indicating that the respective valve should be actuated. While the inputs can be provided in a variety of manners, the inputs are typically provided by means of an optocoupler, a line driver/line receiver, or the like. When the inputs are provided by means of an optocoupler, the optocoupler typically inverts the signal. In such an embodiment, the input to the controller would have a low state to indicate that the valve should be actuated and a high state to indicate that the valve should not be activated.

In addition to the DC/DC converter 30, the supply voltage is also input to an analog-to-digital (A/D) converter 32. The resulting digital representation of the supply voltage is input to the controller 28. As the supply voltage will typically vary during flight of the unmanned vehicle, the controller 28 can monitor the supply voltage and adjust the output signal to maintain the current to the valve at the desired value. This is discussed in detail below.

In addition to the controller 28, the digital programmable driver circuit 22 includes at least one valve driver circuit 24. Each valve driver circuit of a digital programmable driver circuit is responsive to the controller 28 and, more typically, is connected to a respective channel of the multi-channel programmable logic device. As such, the controller can independently direct the valve driver circuits to open respective ones of the valves 20. It should be appreciated that a typical controller will be capable of controlling multiple valve driver circuits and multiple valves. For example, a controller might have 12 channels such that it can receive 12 different signals from the microprocessor 27, wherein each signal indicates that a different valve should be actuated. Such a controller could have up to 12 outputs to control 12 separate valve driver circuits and 12 separate valves. For illustration purposes, FIG. 2 shows only one input to controller 28, one valve driver circuit 24, and one valve 20.

Figure 3:
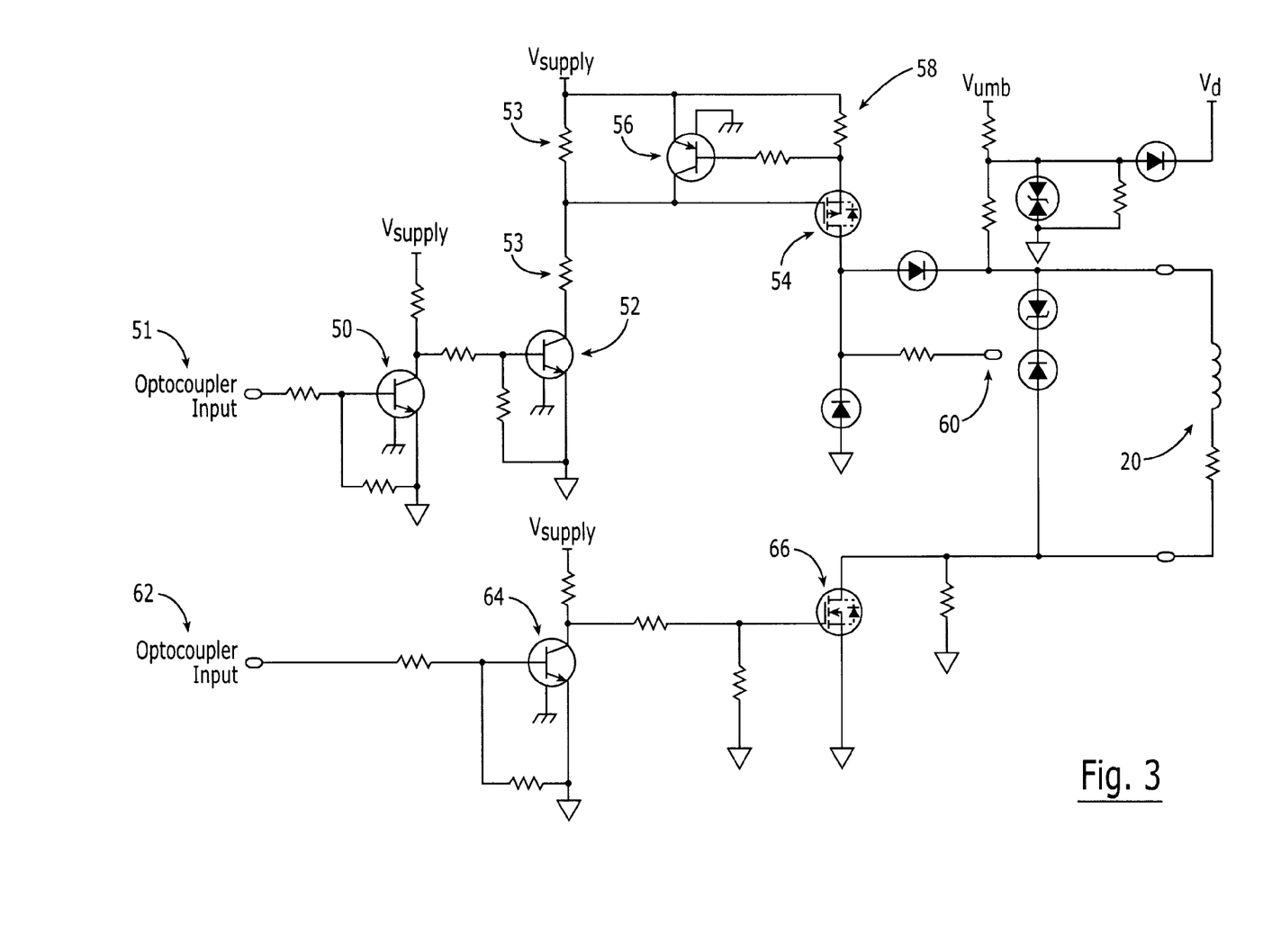
FIG. 3 is a circuit diagram of a valve driver circuit of the digital programmable driver circuit, according to one embodiment to the present invention.

As shown in FIG. 2, each valve driver circuit 24 includes a power switch 34 for controllably providing current to the valve 20. In this regard, the power switch is typically a transistor, such as a p-channel MOSFET, that connects the valve to the supply voltage, typically between about 24 VDC and 35 VDC, in instances in which the power switch is closed, and isolates the valve from the supply voltage in instances in which the power switch is open. See, for example, element 54 of FIG. 3 which depicts the p-channel MOSFET within the circuit diagram of the valve driver circuit. While components of a particular type are depicted in FIG. 3, the components can change somewhat without departing from the spirit and scope of the invention since the circuit diagram is provided for means of an illustration.

As shown in FIG. 2, the power switch 34 of the valve driver circuit 24 is controllably opened and closed by the controller 28. Since the power switch is typically embodied by a p-channel MOSFET that requires much higher voltages for switching on and off than a controller, such as a programmable logic device, typically provides, the valve driver circuit can also include a control switch 36. As shown in the circuit diagram of the valve driver circuit, the control switch is preferably a transistor, such as an NPN bipolar transistor or an n-channel MOSFET. The control switch is preferably connected between the controller and the power switch such that the control signals provided by the controller cause the control switch to appropriately bias the power switch in order to cause the power switch to controllably close and open, thereby connecting and disconnecting the valve to the supply voltage, respectively.

In one embodiment in which the control switch is an NPN bipolar transistor and the power switch is a p-channel MOSFET, the collector of the control switch can be connected to the gate of the power switch. A high output from the controller, such as a 5 V signal, will apply approximately half of the supply voltage to the gate to source of the power switch so as to close the power switch and provide current to the valve 20. Conversely, a low output from the controller, such as a 0 V signal, will apply the supply voltage to the gate to source of the power switch so as to open the power switch and halt current flow to the valve.

Alternatively, an optocoupler 29 may be interposed between the controller and the control switch to electrically isolate the controller from the control switch. Because the optocoupler 29 inverts the signal, a high output from the controller becomes a low output from the optocoupler 29. As such, an inverter 33 may be interposed between the optocoupler 29 and the control switch 36 to invert the signal again. In such an embodiment, as illustrated in FIG. 3, a second transistor 50, such as an NPN bipolar transistor, may be interposed between the optocoupler output 51 (i.e., the output from optocoupler 29) and the control switch 52 to invert the signal again, such that a low signal from the optocoupler 29 results in current flow to the valve. When the signal from the controller is high and the output signal 51 from the optocoupler 29 is low, no current flows to the base of the second NPN bipolar transistor 50 such that the second transistor is open. This causes current to then flow to the base of the first transistor 52 such that the first transistor 52 is closed. This in turn causes the voltage divider 53 to apply approximately half of the supply voltage to the gate of the p-channel MOSFET 54 (i.e., the power switch) so as to close the power switch and provide current to the valve 20.

Referring back to FIG. 2, the valve driver circuit 24 can also include an on/off switch 40, such as an n-channel MOSFET, connected via a relatively small resistor 41, such as a 0.1 ohm resistor, to ground and connected in parallel to a voltage suppressor. The on/off switch is controlled by the input signals to the on/off switch from a master satellite controller such as microprocessor 27 of FIG. 1, and the on/off switch is closed while the valve 20 is actuated so as to permit current to flow on through. An optocoupler 37 may be interposed between the master satellite controller and the on/off switch 40 for electrical isolation, as well as an inverter 39 to invert the signal from the optocoupler 37. The on/off switch 40 can quickly open in response to the input signal to halt current flow through the valve, thereby quickly deactivating or closing the valve. It should be appreciated that the input to the optocoupler 37 and the input to the controller 28 may originate as separate output signals from the master satellite controller. In such an embodiment, the requirement that the two signals must both indicate that the valve is to be actuated minimizes the risk of improperly actuating valve 20. In an alternative embodiment, one output signal from the satellite master controller may be input to both the optocoupler 37 and the controller 28 where the added safety inherent in using separate signals is not required.

A valve is typically modeled by an inductor in series with a resistor, such as a 5 millihenry inductor and a 5-10 ohm resistor. Valve 20 of FIG. 3 is illustrated as such. As such, the on/off switch 40 may serve a valuable purpose in conjunction with the valve driver circuit since the inductive component of the valve would otherwise cause the valve to slowly close. Since the valve typically controls the flow of fuel from the combustion chamber, it is desired to quickly open and quickly close the valve such that the propulsion effectively starts and stops on demand and the resulting path of a satellite can be accurately determined.

Referring again to FIG. 3, an on/off switch 66 may be controlled by an input signal from a source external to the driver circuit (i.e., element 22 of FIG. 2). For example, a satellite master controller, such as microprocessor 27 of FIG. 1, may provide the input signal to the on/off switch 66. On/off switch 66 is closed while the valve 20 is actuated so as to permit current to flow through the valve. However, the on/off switch 66 can quickly open in response to the input signal to halt current flow through the valve, thereby quickly deactivating or closing the valve. As such, the power switch 54 and the on/off switch 66 would both be required to be on in order to cause the valve 20 to actuate in this embodiment, thereby minimizing the risk of improperly actuating valve 20. In FIG. 3, the input to on/off switch 66 is optocoupler output 62 (i.e., the output from optocoupler 37 of FIG. 2), such that the external source is electrically isolated from the on/off switch. Because the optocoupler 37 inverts the signal, a high output from the external source becomes a low optocoupler output 62. As such, a transistor 64, such as an NPN bipolar transistor, may be interposed between the optocoupler output 62 and the on/off switch 66 to invert the signal again, such that a low optocoupler output 62 results in current flow through the valve. When the signal from the external source is high and the optocoupler output 62 is low, no current flows to the base-emitter junction of the NPN transistor 64. Transistor 64 collector-to-emitter opens, allowing voltage to activate the gate-to-source junction of the on/off switch 66, which may be an n-channel MOSFET, such that the switch 66 is closed, thereby allowing current to flow through the valve 20.

The valve driver circuit 24 will also typically include a signal monitor 38. The signal monitor 38 is connected to the output of the power switch 34 to monitor the pulse widths of the voltage that is being applied to the valve 20. (This is also illustrated in the circuit diagram of FIG. 3, where the signal monitor 60 is connected to the drain of the p-channel MOSFET 54.) The pulse widths of the voltage are input by the signal monitor 38 to the controller 28, such that the controller verifies that each pulse width of the voltage matches each corresponding pulse width of the signal sent from the controller to the power switch 34, except for a slight propagation delay. (The signal that is sent from the controller to the power switch is discussed in detail below.) This verification assures that the waveform of the current reaching the valve is correct. If the two sets of pulse widths do not match, indicating that there may be a problem with the circuitry such as a short circuit, the controller 28 may turn off the signal to the power switch to prevent damage to various components. An optocoupler 31 will typically be interposed between the signal monitor 38 and the controller 28 for electrical isolation, as well as an inverter 35 to invert the signal from optocoupler 31.

Figure 4:
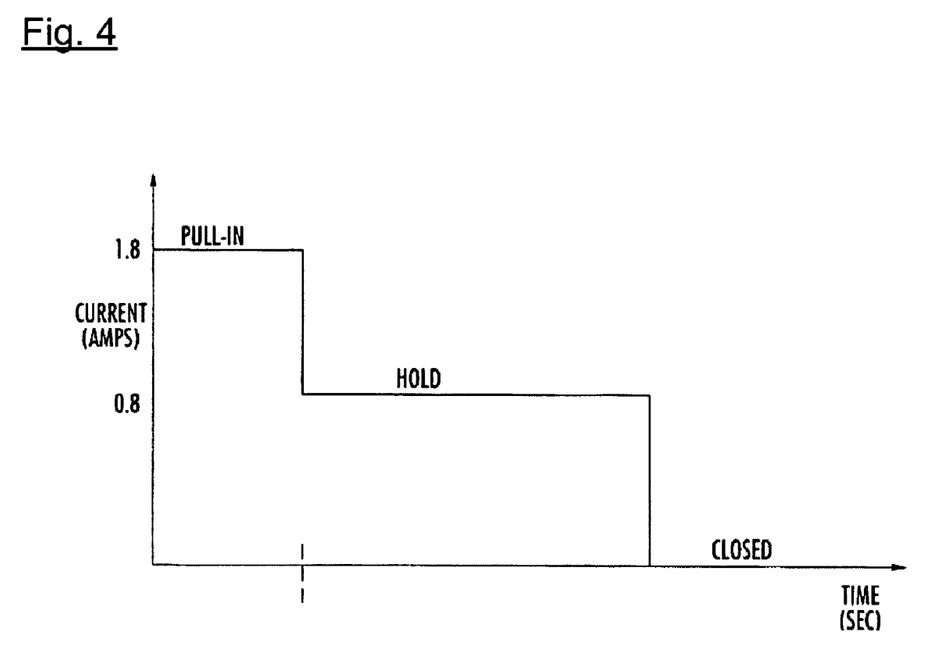
FIG. 4 is a simplified graph of the current provided to a valve in order to open the valve.

A valve generally requires a greater amount of current during an initial stage in which the valve is being opened. The greater amount of current is typically referred to as the pull-in current and, in one embodiment, is about 1.8 amps for a predetermined pull-in time of 0.9 milliseconds to 1.2 milliseconds. Once the valve has been opened as a result of providing the valve with the pull-in current, a lesser amount of current can be provided to the valve in order to maintain the valve in the open position. In this regard, a hold current, such as about 0.8 amps, can be provided once the valve has been opened for the remainder of the period of time during which the valve is to remain in an open position. In order to close the valve, current can then be removed from the valve. By way of example, FIG. 4 illustrates the pull-in current provided to a valve in order to originally open the valve and the hold current provided to the valve to hold the valve in an open position as well as the subsequent removal of current from the valve in order to close the valve.

As discussed above, a signal from the microprocessor 27 is sent to the controller 28 to direct controller 28 to send an output signal to valve driver circuit 24, which in turn sends current to valve 20. The current provided to the valve will vary based on a number of factors. The current will typically be higher while the valve is opening (the pull-in current) and will be lower while the valve is being held open (the hold current). Additionally, the pull-in time may vary based on the specific valve being used, thereby requiring the pull-in current to be changed if the valve is changed. The supply voltage may decrease during the flight of the satellite, causing a corresponding change to the current flowing to the valve. The inductance and resistance of the valve may vary depending upon the specific valve used or based upon the temperature of the valve, for example.

Figure 5:
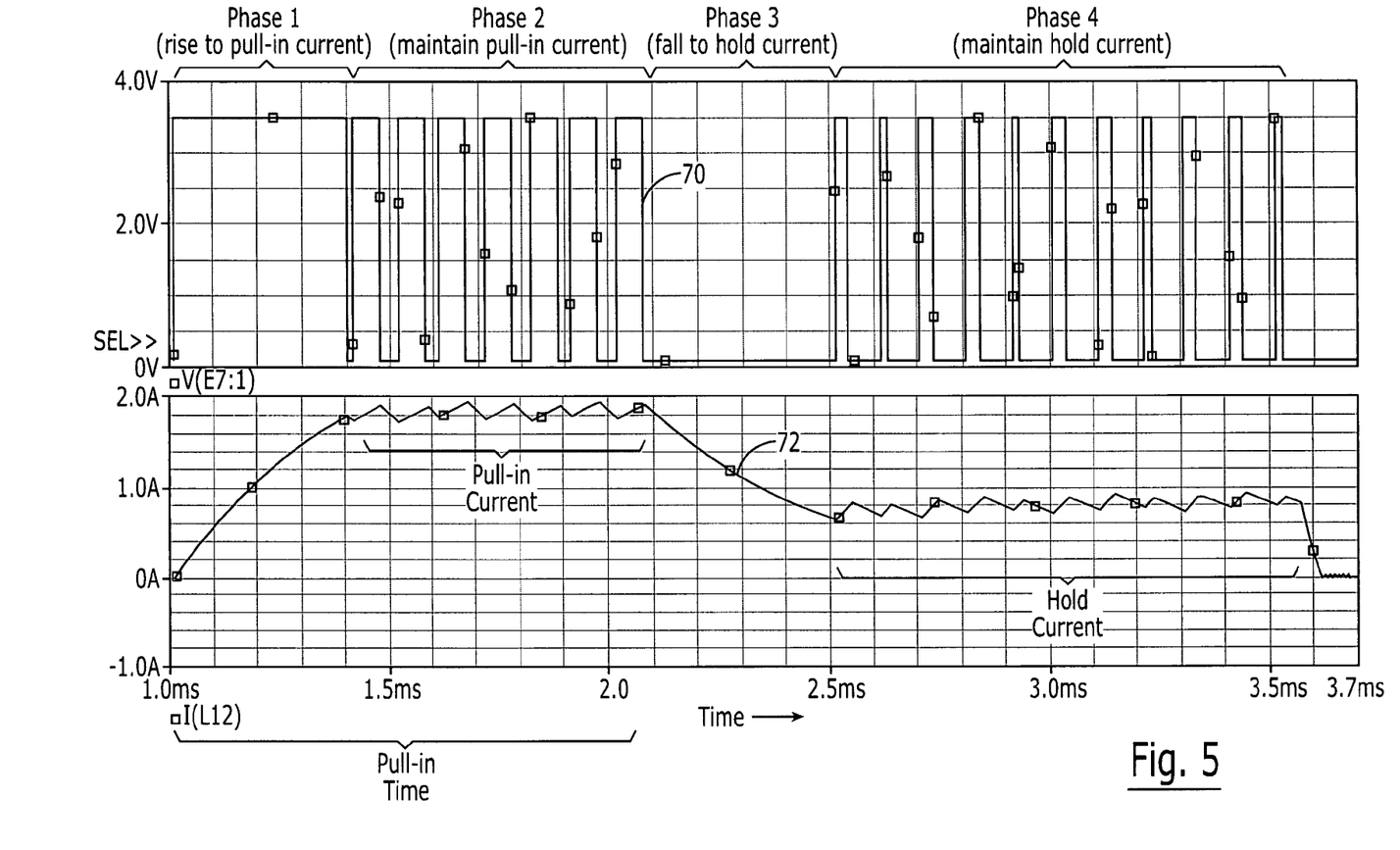
FIG. 5 is a graph of the actual output signal from the controller and the actual current provided to a valve in order to open the valve, according to one embodiment of the present invention.

The controller 28 of the present invention controls the current flowing to the valve 20 by varying the on/off cycle of the output signal to the power switch 34. The percentage of time the output signal, and therefore the valve current, is on is expressed as the duty cycle. For example, if the output signal is on 75% of the time and off 25% of the time, this is termed a 75% duty cycle. Referring now to FIG. 5, the top X-Y graph illustrates the output signal 70 from the controller, with the X axis representing time in milliseconds and the Y axis representing voltage in volts. The bottom X-Y graph illustrates the current 72 through the valve 20, with the X axis representing time in milliseconds and the Y axis representing current in amps. It should be noted that the X axis for both the top and the bottom X-Y graphs represent the same period of time, such that the bottom X-Y graph illustrates the current through the valve as it controlled by the corresponding, contemporaneous output voltage signal 70.

The varying of the output signal may be considered in four phases, as indicated in FIG. 5. In the first phase, the controller output signal 70 will typically have a 100% duty cycle (i.e., constant on) while the current 72 through the valve ramps up to the pull-in current. The time required for the current to reach the pull-in current is termed the rise time. In the second phase, the controller will then typically cycle the output signal 70 repeatedly on and off such that the current 72 through the valve cycles on and off correspondingly, thereby causing the current through the valve to generally oscillate about the desired pull-in current. This cycling on and off is termed the pull-in duty cycle. The second phase generally begins after the rise time has elapsed and lasts until the pull-in time minus the rise time has elapsed. In the third phase, the controller output signal 70 will typically have a 0% duty cycle (i.e., constant off) while the current 72 through the valve decreases to the hold current. The time required for the current to decrease to the hold current is termed the fall time. In the fourth phase, the controller will then typically cycle the output signal 70 repeatedly on and off such that the current 72 through the valve cycles on and off correspondingly, thereby causing the current through the valve to generally oscillate about the desired hold current. This cycling on and off is termed the hold duty cycle. As the hold current is generally less than the pull-in current, the hold duty cycle would generally be less than the pull-in duty cycle.

The controller 28 is capable of receiving several parameter values which affect the output signal and the current through the valve. For example, the controller may receive values for one or more of valve resistance (R), valve inductance (L), supply voltage (V), valve pull-in current ($I_P$), valve hold current ($I_H$), and valve pull-in time ($T_P$). These parameter values may be programmed into the controller during the manufacture of the unmanned space vehicle, or may be received by the controller during flight of the space vehicle. For example, it may be determined during testing of the space vehicle that a particular valve does not open quickly enough. The valve may be replaced and the new parameters of valve resistance, valve inductance, valve pull-in current, valve hold current, and valve pull-in time can be programmed into the controller. The ability to quickly and easily enter and change these parameter values enables necessary adjustments to be made to the valve current late in the design cycle of the space vehicle without requiring corresponding hardware changes. This then reduces the overall time to ready the vehicle for flight and reduces the cost of manufacture. This ability to enter and change these parameter values also enables adjustments to be made to the valve current during flight, permitting adjustments that might otherwise not be possible.

Based on the parameter values received by the controller, the controller typically calculates a rise time ($T_R$), a pull-in duty cycle ($DC_P$), a fall time ($T_F$), and a hold duty cycle ($DC_H$). The controller will typically use the following equations to calculate these values: $T_R=-(L/R)*\ln(1-(I_P*R/V))$; $DC_P=I_P*R/V$; $T_F=-(L/R)*\ln((I_P-I_H)*R/V)$; and $DC_H=I_H*R/V$. The controller uses these calculated values to appropriately control the output signal and therefore the valve current corresponding to the parameter values. As discussed above, the controller typically causes the output signal to have a 100% duty cycle for a period of time equal to the calculated rise time, thereby causing the current provided to the valve to increase until the current provided to the valve is approximately equal to the pull-in current. Thereafter, the controller typically causes the output signal to have a duty cycle equal to the calculated pull-in duty cycle for a period of time equal to the valve pull-in time minus the rise time, thereby causing the current provided to the valve to be approximately equal to the pull-in current so as to open the valve. Thereafter the controller typically causes the output signal to have a 0% duty cycle for a period of time equal to the calculated fall time, thereby causing the current provided to the valve to decrease until the current provided to the valve is approximately equal to the hold current. Thereafter the controller typically causes the output signal to have a duty cycle equal to the calculated hold duty cycle, thereby causing the current provided to the valve to be approximately equal to the hold current and maintaining the valve in an open position.

After holding the valve open for the desired amount of time to affect the desired propulsion and/or direction of the vehicle, the microprocessor 27 will then typically indicate to the controller 28 that the valve should be closed by changing the state of the signal being sent to the controller. The controller then changes the state of the signal being sent to the valve driver circuit 24, resulting in the closure of the power switch 34 and the stopping of current flowing to the valve 20. These changes to the output signal 70 and the valve current 72 are illustrated in FIG. 5, beginning after the end of phase 4.

Referring back to the circuit diagram of FIG. 3, a transistor, such as a PNP bipolar transistor 56, and a resistor, such as a 0.249 ohm resistor 58, are interposed between the control switch 52 and the power switch 54. The transistor 56 and the resistor 58 limit the amount of current that can flow to the power switch 54. The current may be limited to 20% greater than the maximum current value. For example, in this embodiment the current is limited to 2.8 amps. If the current flowing to the p-channel MOSFET that comprises the power switch 54 in this embodiment exceeds 2.8 amps, this causes the threshold voltage of the PNP bipolar transistor 56 (which is 0.7 V) to be reached (i.e., 2.8 amps multiplied by 0.249 ohms equals 0.7 volts), thereby turning the PNP bipolar transistor on and limiting the current flowing through the p-channel MOSFET 54 to 2.8 amps.

In addition to capturing the pulse width of the valve current by the signal monitor 60 in order to compare the pulse width of the controller output signal to the pulse width of the valve current as discussed above, the signal monitor 60 also captures the voltage at the drain of the power switch and reports that voltage to the controller. The voltage at the drain of the power switch equals the voltage at the high side input to the valve. If the high side input to the valve is at 0 V (and therefore the drain of the power switch is at 0 V), then this indicates that the valve is short circuited. Reporting this voltage to the controller allows the controller to turn off the signal to the power switch to prevent damage to the short circuited valve and/or the power switch 54.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus for actuating valves comprising:
   at least one valve driver circuit for opening and closing a valve, the valve driver circuit comprising a power switch for providing both a pull-in current and a hold current to the valve in order to open the valve; and
   a controller capable of sending an output signal to the at least one valve driver circuit for directing the power switch of the at least one valve driver circuit to provide current to the valve, the controller further configured to be programmed with a plurality of parameters including valve resistance (R) and valve inductance (L), the controller also being configured to be reprogrammed with a respective one or more of the plurality of parameters when the respective one or more plurality of parameters have changed in value, the controller responsive to the same plurality of parameters, including valve resistance (R) and valve inductance (L), so as to define the output signal based thereupon for each of a plurality of cycles of opening and closing the valve, wherein the controller is configured to define the output signal in different manners to direct the power switch to provide the pull-in current and the hold current.

2. The apparatus of claim 1, wherein the controller is responsive to parameters selected from the group consisting of valve resistance (R), valve inductance (L), supply voltage (V), valve pull-in current ($I_P$), valve hold current ($I_H$), and valve pull-in time ($T_P$).

3. The apparatus of claim 2, wherein the controller determines a rise time ($T_R$) based upon valve inductance, valve resistance, valve pull-in current, and supply voltage; and wherein the controller causes the output signal to have a 100% duty cycle for a period of time equal to the rise time.

4. The apparatus of claim 3, wherein the controller determines the rise time as follows: $T_R=-(L/R)*\ln(1-(I_P*R/V))$.

5. The apparatus of claim 2, wherein the controller determines a pull-in duty cycle ($DC_P$) based upon valve resistance, valve pull-in current, and supply voltage; and wherein the controller causes the output signal to have a duty cycle equal to the pull-in duty cycle for a period of time equal to the valve pull-in time minus the rise time.

6. The apparatus of claim 5, wherein the controller determines the pull-in duty cycle as follows: $DC_P=I_P*R/V$.

7. The apparatus of claim 2, wherein the controller determines a fall time ($T_F$) based upon valve inductance, valve resistance, valve pull-in current, valve hold current, and supply voltage; and wherein the controller causes the output signal to have a 0% duty cycle for a period of time equal to the fall time.

8. The apparatus of claim 7, wherein the controller determines the fall time as follows: $T_F=-(L/R)*\ln((I_P-I_H)*R/V)$.

9. The apparatus of claim 2, wherein the controller determines a hold duty cycle ($DC_H$) based upon valve resistance, valve hold current, and supply voltage; and wherein the controller causes the output signal to have a duty cycle equal to the hold duty cycle.

10. The apparatus of claim 9, wherein the controller determines the hold duty cycle as follows: $DC_H = I_H * R/V$.

11. The apparatus of claim 1, wherein the controller is capable of receiving a modified one of the plurality of parameters, and wherein the controller is capable of modifying the output signal in response.

12. The apparatus of claim 11, further comprising an analog-to-digital controller for providing a digital representation of a supply voltage, wherein the modified one of the plurality of parameters is a modified representation of the supply voltage that is received by the controller from the analog-to-digital converter.

13. The apparatus of claim 1, wherein the at least one valve driver circuit further comprises a control switch, responsive to the controller, for providing control signals to the power switch of the at least one valve driver circuit.

14. The apparatus of claim 13, wherein the at least one valve driver circuit further comprises a transistor and a resistor between the control switch and the power switch, such that current flowing through the power switch is limited to a predefined current.

15. An apparatus for actuating valves comprising:
at least one valve driver circuit for opening and closing a valve, the valve driver circuit comprising a power switch for providing current to the valve in order to open the valve; and
a controller capable of sending an output signal to the at least one valve driver circuit for directing the power switch of the at least one valve driver circuit to provide current to the valve, the controller further capable of receiving a plurality of parameters, the controller responsive to the plurality of parameters so as to define the output signal based thereupon,
wherein the controller is further capable of monitoring the voltage at the output of the power switch such that the controller detects a short circuit of the valve by determining that the voltage at the output of the power switch is equal to zero volts, and wherein the controller is further capable of directing the power switch to prevent further current flow to the valve when a short circuit is detected.

16. The apparatus of claim 15, wherein the controller, when a short circuit is detected, is further capable of sending an output signal to the at least one valve driver circuit for directing the power switch of the at least one valve driver circuit to provide current to the valve to determine if the short circuit has resolved.

17. An apparatus for actuating valves comprising:
at least one valve driver circuit for opening and closing a valve, the valve driver circuit comprising a power switch for providing current to the valve in order to open the valve; and
a controller capable of sending an output signal to the at least one valve driver circuit for directing the power switch of the at least one valve driver circuit to provide current to the valve, the controller further capable of receiving a plurality of parameters, the controller responsive to the plurality of parameters so as to define the output signal based thereupon,
wherein the controller is further capable of comparing a pulse width of the current from the power switch to a pulse width of the output signal from the controller to determine if the pulse width of the current from the power switch matches the pulse width of the output signal from the controller, and directing the power switch to prevent further current flow to the valve when the pulse width of the current from the power switch does not match the pulse width of the output signal from the controller.

18. The apparatus of claim 1, further comprising at least one ordnance driver circuit for activating an ordnance, said ordnance driver circuit comprising a power switch for providing current to the ordnance to activate the ordnance, wherein the controller is further capable of sending a second output signal to the at least one ordnance driver circuit for directing the power switch of the at least one ordnance driver circuit to provide current to the ordnance, the controller further responsive to the plurality of parameters so as to modify the second output signal.

19. A method of actuating a valve comprising:
programming a controller with a plurality of parameters including valve resistance (R) and valve inductance (L);
defining an output signal to a valve driver circuit based on the same plurality of parameters, including valve resistance (R) and valve inductance (L), for each of a plurality of cycles of opening and closing the valve;
directing a power switch of the valve driver circuit to provide both a pull-in current and a hold current to the valve based on the output signal;
opening the valve in response to the current, and
reprogramming the controller with a respective one or more of the plurality of parameters when the respective one or more plurality of parameters have changed in value.

20. The method of claim 19, wherein the plurality of parameters are selected from the group consisting of valve resistance, valve inductance, supply voltage, valve pull-in current, valve hold current, and valve pull-in time.

21. The method of claim 20, further comprising:
determining a rise time based upon valve inductance, valve resistance, valve pull-in current, and supply voltage; and
causing the output signal to have a 100% duty cycle for a period of time equal to the rise time.

22. The method of claim 20, further comprising:
determining a pull-in duty cycle based upon valve resistance, valve pull-in current, and supply voltage; and
causing the output signal to have a duty cycle equal to the pull-in duty cycle for a period of time equal to the valve pull-in time minus the rise time.

23. The method of claim 20, further comprising:
determining a fall time based upon valve inductance, valve resistance, valve pull-in current, valve hold current, and supply voltage; and
causing the output signal to have a 0% duty cycle for a period of time equal to the fall time.

24. The method of claim 20, further comprising:
determining a hold duty cycle based upon valve resistance, valve hold current, and supply voltage; and
causing the output signal to have a duty cycle equal to the hold duty cycle.

25. The method of claim 20, further comprising:
receiving a modified one of the plurality of parameters;
modifying the output signal in response to the modified one of the plurality of parameters.

26. An unmanned vehicle comprising:
a vehicle body;
at least one valve for delivering thrust to the vehicle body;
at least one valve driver circuit for opening and closing a valve, the valve driver circuit comprising a power switch for providing both a pull-in current and a hold current to the valve in order to open the valve; and a controller capable of sending an output signal to the at least one valve driver circuit for directing the power switch of the at least one valve driver circuit to provide current to the valve, the controller further configured to be programmed with a plurality of parameters including valve resistance (R) and valve inductance (L), the controller also being configured to be reprogrammed with a respective one or more of the plurality of parameters when the respective one or more plurality of parameters have changed in value, the controller responsive to the same plurality of parameters, including valve resistance (R) and valve inductance (L), so as to define the output signal based thereupon for each of a plurality of cycles of opening and closing the valve, wherein the controller is configured to define the output signal in different manners to direct the power switch to provide the pull-in current and the hold current.

27. The unmanned vehicle of claim 26, wherein the controller is responsive to parameters selected from the group consisting of valve resistance (R), valve inductance (L), supply voltage (V), valve pull-in current ($I_P$), valve hold current ($I_H$), and valve pull-in time ($T_P$).

28. The unmanned vehicle of claim 27, wherein the controller determines a rise time ($T_R$) based upon valve inductance, valve resistance, valve pull-in current, and supply voltage; and wherein the controller causes the output signal to have a 100% duty cycle for a period of time equal to the rise time.

29. The unmanned vehicle of claim 27, wherein the controller determines a pull-in duty cycle ($DC_P$) based upon valve resistance, valve pull-in current, and supply voltage; and wherein the controller causes the output signal to have a duty cycle equal to the pull-in duty cycle for a period of time equal to the valve pull-in time minus the rise time.

30. The unmanned vehicle of claim 27, wherein the controller determines a fall time ($T_F$) based upon valve inductance, valve resistance, valve pull-in current, valve hold current, and supply voltage; and wherein the controller causes the output signal to have a 0% duty cycle for a period of time equal to the fall time.

31. The unmanned vehicle of claim 27, wherein the controller determines a hold duty cycle ($DC_H$) based upon valve resistance, valve hold current, and supply voltage; and wherein the controller causes the output signal to have a duty cycle equal to the hold duty cycle.

32. The unmanned vehicle of claim 26, wherein the controller is capable of receiving a modified one of the plurality of parameters, and wherein the controller is capable of modifying the output signal in response.

33. The unmanned vehicle of claim 26, wherein the unmanned vehicle is a satellite.

* * * * *

UNITED STATES PATENT AND TRADEMARK OFFICE
CERTIFICATE OF CORRECTION

PATENT NO. : 7,578,481 B2  Page 1 of 1
APPLICATION NO. : 11/066176
DATED : August 25, 2009
INVENTOR(S) : Smith et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1153 days.

Signed and Sealed this

Seventh Day of September, 2010

David J. Kappos
*Director of the United States Patent and Trademark Office*